(12) United States Patent
Wotzlaw

(10) Patent No.: US 9,230,328 B1
(45) Date of Patent: Jan. 5, 2016

(54) PROVIDING IMAGE PARAMETERS

(71) Applicant: Google Inc., Mountain View, CA (US)

(72) Inventor: Ronald Frank Wotzlaw, San Jose, CA (US)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 13/931,619

(22) Filed: Jun. 28, 2013

(51) Int. Cl.
*G06K 9/40* (2006.01)
*G06T 7/00* (2006.01)

(52) U.S. Cl.
CPC .................................. *G06T 7/0022* (2013.01)

(58) Field of Classification Search
None
See application file for complete search history.

(56) References Cited

U.S. PATENT DOCUMENTS

| | | | |
|---|---|---|---|
| 2005/0196040 A1* | 9/2005 | Ohara | 382/167 |
| 2009/0313141 A1* | 12/2009 | Kon | 705/27 |
| 2012/0011540 A1* | 1/2012 | Pulford | 725/32 |

OTHER PUBLICATIONS

Bae et al., "Two-Scale Mangement for Photographic Look", Computer Science and Artificial Intelligence Laboratory MIT, 2006.
Bae et al., "Statistical Analysis and Transfer of Pictorial Styles", Computer Science and Artificial Intelligence Laboratory MIT, 2004.

* cited by examiner

*Primary Examiner* — Eueng-Nan Yeh

(57) ABSTRACT

Implementations generally relate to providing image parameters in a social network system. In some implementations, a method includes receiving a plurality of reference images associated with a target user in a social network system. The method also includes determining one or more image parameter values based on social activity of the target user. The method also includes modifying one or more target images based on the one or more determined image parameter values.

16 Claims, 7 Drawing Sheets

300

400

PROVIDING IMAGE PARAMETERS

BACKGROUND

The popularity and convenience of digital cameras as well as the widespread of use of Internet communications have caused user-produced images such as photographs to become ubiquitous. Image editing systems for various consumer electronic devices and personal computers enable a user to manipulate images. Such image editing systems typically require the user to understand complicated and difficult instructions to manipulate the image. This level of knowledge places advanced editing features out of the grasp of the average user.

SUMMARY

Implementations generally relate to providing image parameters in a social network system. In some implementations, a method includes receiving a plurality of reference images associated with a target user in a social network system. The method also includes determining one or more image parameter values based on social activity of the target user. The method also includes modifying one or more target images based on the one or more determined image parameter values.

With further regard to the method, in some implementations, the reference images are received based on target user interactions with the one or more reference images. In some implementations, the determining of the one or more image parameter values includes: selecting one or more reference images from a plurality of candidate reference images; and determining the one or more image parameter values from the one or more selected reference images. In some implementations, the determining of the one or more image parameter values includes: ranking a plurality of candidate reference images based on the social activity of the target user; selecting one or more reference images from the candidate reference images; and determining the one or more image parameter values from the one or more selected reference images. In some implementations, the social activity includes the target user interacting with at least one reference image in the social network system. In some implementations, the social activity includes the target user viewing at least one reference image a predetermined number of times in the social network system. In some implementations, the social activity includes the target user recommending at least one reference image in the social network system. In some implementations, the social activity includes the target user commenting on at least one reference image in the social network system. In some implementations, the determining of the one or more image parameter values includes: clustering a plurality of candidate reference images into clusters; selecting one or more reference images from the candidate reference images based on the clusters; and determining the one or more image parameter values from the one or more selected reference images.

In some implementations, a method includes receiving a plurality of reference images associated with a target user in a social network system. The method also includes determining one or more image parameter values based on the social activity of the target user, where the social activity includes the target user interacting with one or more of the reference images. In some implementations, the determining of the one or more image parameter values includes: selecting one or more reference images from a plurality of candidate reference images; and determining the one or more image parameter values from the one or more selected reference images. The method also includes modifying one or more target images based on the one or more determined image parameter values.

With further regard to the method, in some implementations, the social activity includes the target user viewing at least one reference image a predetermined number of times in a social network system. In some implementations, the social activity includes the target user recommending at least one reference image in a social network system. In some implementations, the social activity includes the target user commenting on at least one reference image in a social network system.

In some implementations, a system includes one or more processors, and logic encoded in one or more tangible media for execution by the one or more processors. When executed, the logic is operable to perform operations including: receiving a plurality of reference images associated with a target user in a social network system; determining one or more image parameter values based on the social activity of the target user; and modifying one or more target images based on the one or more determined image parameter values.

With further regard to the system, in some implementations, the reference images are received based on target user interactions with the one or more reference images. In some implementations, the determining of the one or more image parameter values includes: selecting one or more reference images from a plurality of candidate reference images; and determining the one or more image parameter values from the one or more selected reference images. In some implementations, the determining of the one or more image parameter values includes: ranking a plurality of candidate reference images based on the social activity of the target user; selecting one or more reference images from the candidate reference images; and determining the one or more image parameter values from the one or more selected reference images. In some implementations, the social activity includes the target user interacting with at least one reference image in the social network system. In some implementations, the social activity includes the target user viewing at least one reference image a predetermined number of times in the social network system. In some implementations, the social activity includes the target user recommending at least one reference image in the social network system.

DETAILED DESCRIPTION

Implementations described herein provide image parameters in a social network system. As described in more detail below, implementations provide a user processing of images that matches the user's taste. Implementations combine data associated with how images were previously edited with data associated with the user's likes in order to provide suggestions for image edits.

In various implementations, a system receives reference images associated with a target user in a social network. The system then determines one or more image parameter values based on the social activity of the target user, where the social activity may involve the target user interacting with the reference images. For example, in various implementations, the social activity may include the target user viewing at least one reference image a predetermined number of times in the social network system. The social activity may also include the target user recommending at least one reference image in the social network system. The social activity may also include the target user commenting on at least one reference image in the social network system.

In some implementations, to determine the one or more image parameter values, the system may select one or more reference images from the candidate reference images, and determine the one or more image parameter values from the selected reference images. In some implementations, to determine the one or more image parameter values, the system may rank candidate reference images based on the social activity of the target user, select a reference image from the candidate reference images, and then determine the one or more image parameter values from the selected reference image. In various implementations, the system then modifies one or more target images based on the one or more determined image parameter values.

Figure 1:
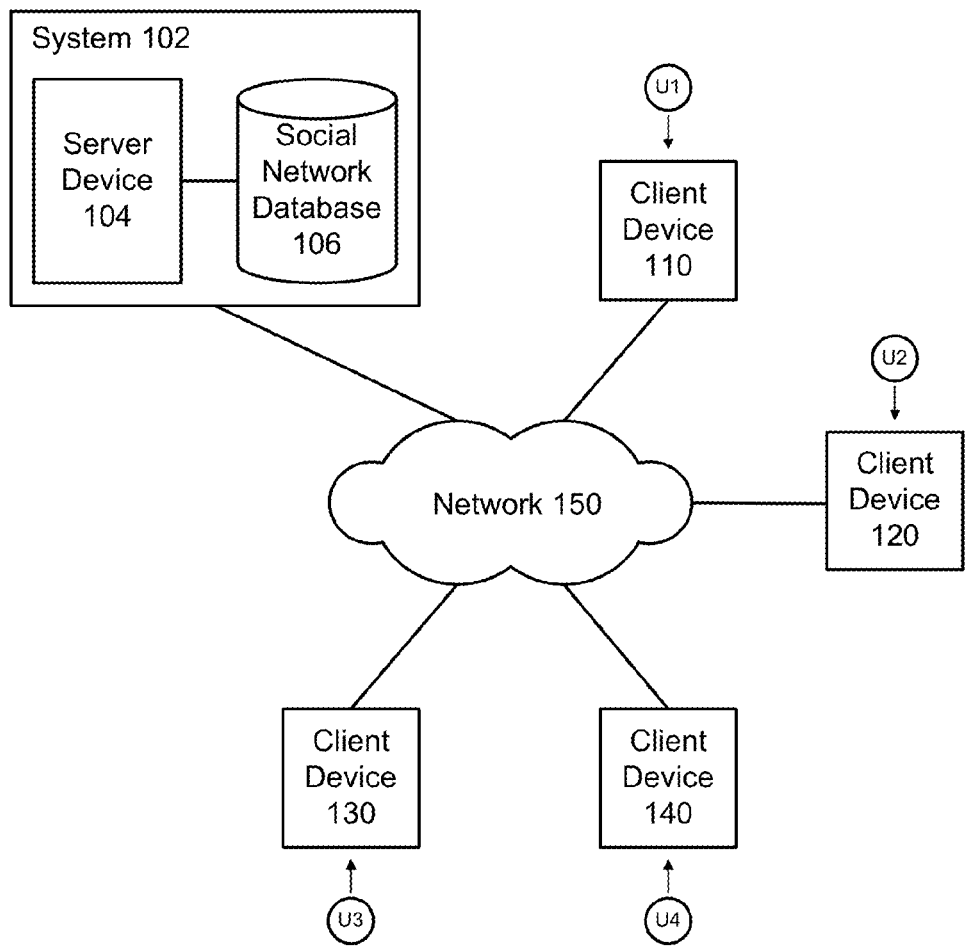
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit various media items such as photos to each other.

Figure 2:
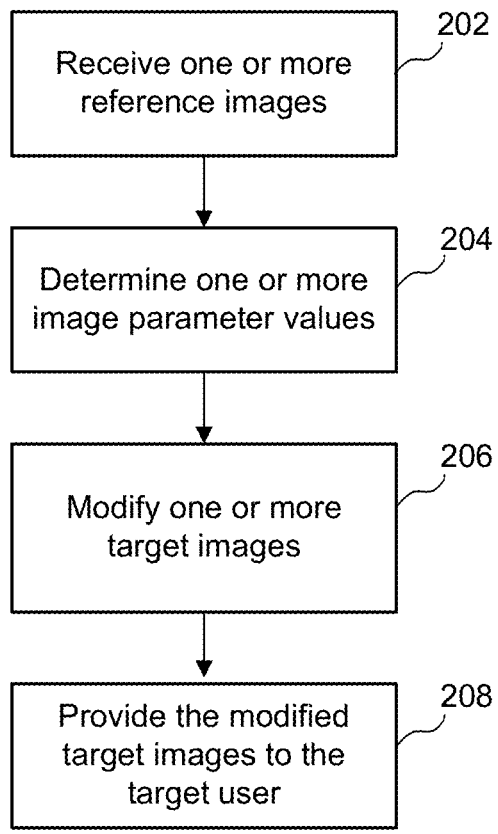
FIG. 2 illustrates an example simplified flow diagram for providing image parameters in a social network system, according to some implementations.

FIG. 2 illustrates an example simplified flow diagram for providing image parameters in a social network system, according to some implementations. Referring to both FIGS. 1 and 2, a method is initiated in block 202, where system 102 receives one or more reference images associated with a target user in a social network. In various implementations, the images may be associated with the target user in a number of ways. For example, in various implementations, system 102 may retrieve images based on the target user's interactions with the images. For example, system 102 may retrieve an image that the target user has recommended, commented on, etc.

In block 204, system 102 determines one or more image parameter values based on the social activity of the target user. System 102 may select image parameters based on a variety of social signals or social networking activity in association with the one or more reference images. For example, the target user may have interacted with the one or more reference images. For example, in some implementations, such activities may include the target user viewing at least one reference image a predetermined number of times in a social network system (e.g., not merely previewing an image in a stream but selecting/clicking on the image for viewing, etc.). In some implementations, such activities may include the target user recommending at least one reference image in a social network system. In some implementations, such activities may include the target user commenting on at least one reference image in a social network system (e.g., commenting positively on the image).

In some implementations, system 102 may directly prompt the target user about his or her taste. For example, in some implementations, system 102 may show a user comparison images and ask the user which of several alternatives the user likes best. Responses from the user provide system 102 with knowledge about the user's taste. In various implementations, suggested edits may be provided based on a database of filters and parameters.

In various implementations, system 102 may match one or more images with any combination of data associated with social signals, in order to apply image parameters from those matched images to new images. Such suggestions have a high probability of matching the user's taste. Various example implementations for determining image parameter values are described in more detail below in connection with FIG. 6.

In block 206, system 102 modifies one or more target images based on the one or more determined image parameter values. As described in more detail below, implementations modify images based on combining data associated with how images were edited (e.g., based on image parameters of reference images) with data associated with images a particular user likes (e.g., based on social signals) in order to provide suggestions for image edits.

In various implementations, system 102 may apply filters with associated parameter values to a given image in a particular, or in no particular order. For example, system 102 may apply image parameter values to a given image in an order that a particular photographer has applied the image parameters.

Figure 3:
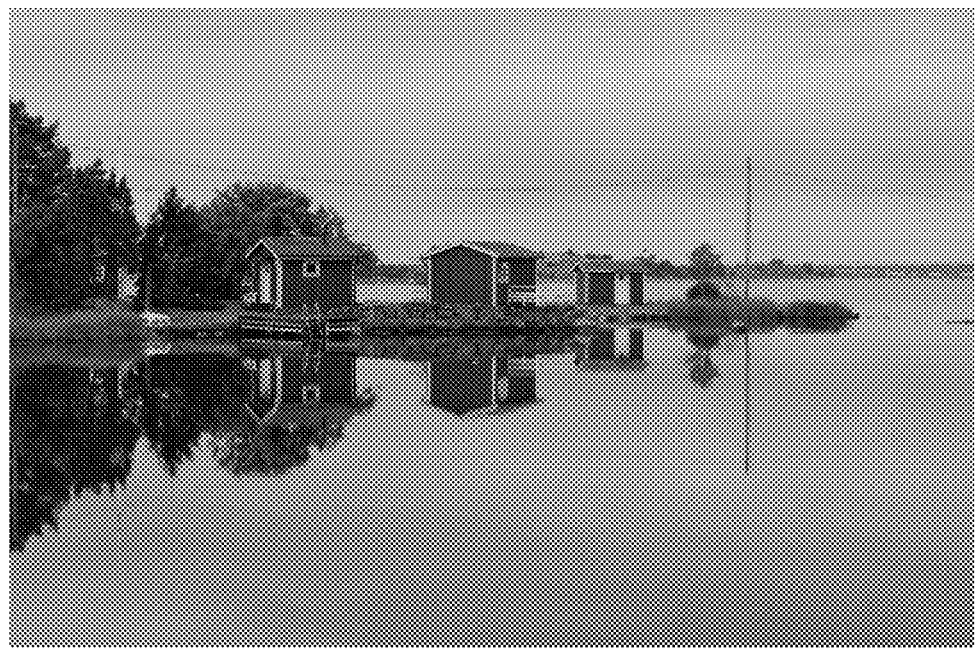
FIG. 3 illustrates an example original photo, according to some implementations.

FIG. 3 illustrates an example original photo 300, according to some implementations. As shown, photo 300 has no image enhancements. Photo 300 may be considered a target image in that system 102 applies image enhancements to photo 300.

Figure 4:
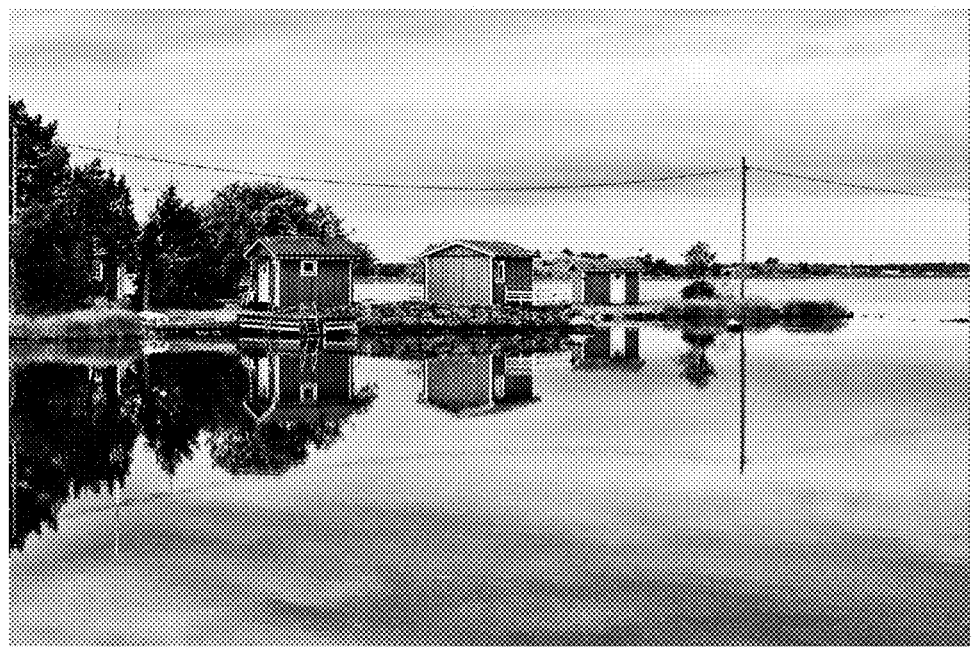
FIG. 4 illustrates an example enhanced photo, according to some implementations.

FIG. 4 illustrates an example enhanced 400 photo, according to some implementations. As shown, photo 400 has image enhancements. For example, photo 400 has image enhancements associated with contrast, structure, and color filter, which are based on data associated with the target user's taste, as described herein. Such suggested image enhancements have a high probability of matching the user's taste. Example details of the image enhancements applied in photo 400 are described below in connection with FIG. 5.

Referring again to FIG. 2, in block 208, system 102 provides the one or more modified target images to the target user. For example, in some implementations, system 102 may cause an original image (e.g., photo 300 of FIG. 3) to be displayed in a user interface, and cause one or more corresponding modified images (e.g., photo 400 of FIG. 4) to be displayed substantially adjacent to the original image. In various implementations, system 102 may cause the one or more enhanced images to be displayed to the target user as suggested edits or suggested image enhancements. System 102 may then enable the user to select and save particular enhanced images.

Figure 5:
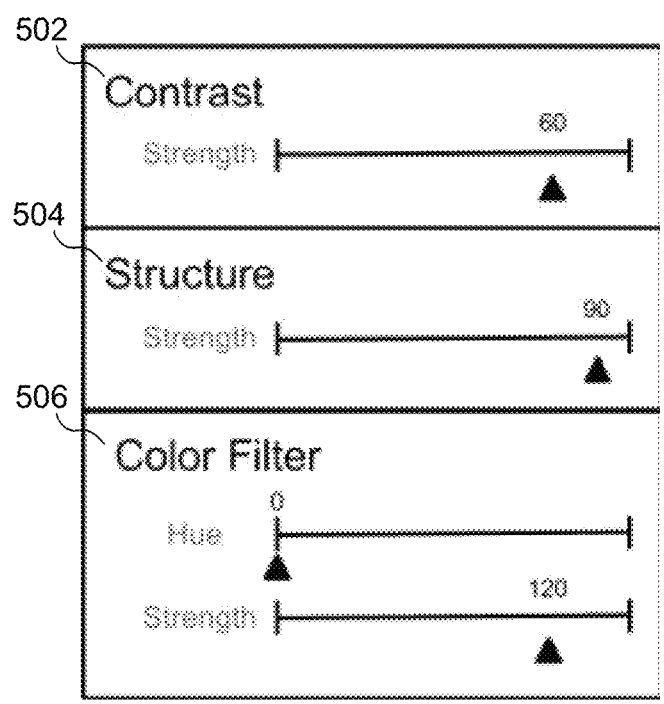
FIG. 5 illustrates an example user interface showing example edits used in image enhancements, according to some implementations.

In various implementations, the target user may or may not view the editing steps used to provide a given image enhancement, depending on the implementation. FIG. 5 below describes an example user interface that may be used to show the target user what the suggested image enhancements are based on.

FIG. 5 illustrates an example user interface 500 showing example edits used in image enhancements, according to some implementations. In various implementations, user interface 500 provides a visualization of example edits used in image enhancements applied to photo 400 of FIG. 4. As shown, system 102 may provide editing steps applied to a given target image (e.g., photo 400) as a list of filters with associated parameters.

As shown, user interface 500 shows image enhancements associated with contrast 502, structure 504, and color filter 506. Other image enhancements are possible, depending on the implementation. In this particular example, contrast 502 is set such that the strength=+60 (on a scale from −100 to 100), structure is set such that the strength=+90 (on a scale from −100 to 100), and color filter is set such that hue=0 (on a scale from 0 to 36) and strength=+120 (on a scale from 0 to 200). In some implementations, a hue of 0 may indicate a red color filter.

In some implementations, system 102 may store these filters with the original unedited image, and may apply the filters to the image to get a final edited image. In some implementations, system 102 performs non-destructive editing of the image, such that the original image is not destroyed.

In some implementations, image characteristics (e.g., contrast, structure, color filter, exposure, brightness, exposure, saturation, etc.) may be changed or corrected automatically by system 102; or system 102 may enable the target user to select some of his or her own stylistic changes to images in order to obtain a desired visual style.

In various implementations, system 102 may cause a given image to be displayed multiple times with different settings applied. Such variations may be displayed as suggestions, where the target user can select one or more. In some implementations, system 102 may provide the target user with settings controls to further modify images. System 102 may enable the target user to accept and then reapply image enhancements to any other images.

In some implementations, system 102 may apply a machine learning algorithm in order to determine and/or fine-tune image parameters based on ongoing analysis of social signals associated with the target user. As such, in various scenarios, image parameter suggestions may change over time giving the user new and interesting ways to edit images, and giving the user reasons to return to older images and try new suggestions. As a result, the user's taste (e.g., informed by the images he likes, etc.) can be directly reflected by the suggested image edits. The user's taste will be refined over time when the user looks at and rates more images. This encourages the user to look at images and rate them. Even passive photographic activities like browsing and looking at images may have a positive effect on active activities (e.g., taking, editing and sharing images, etc.).

Further implementations in association with providing image parameters in a social network system are described in more detail below in connection with FIG. 6.

Figure 6:
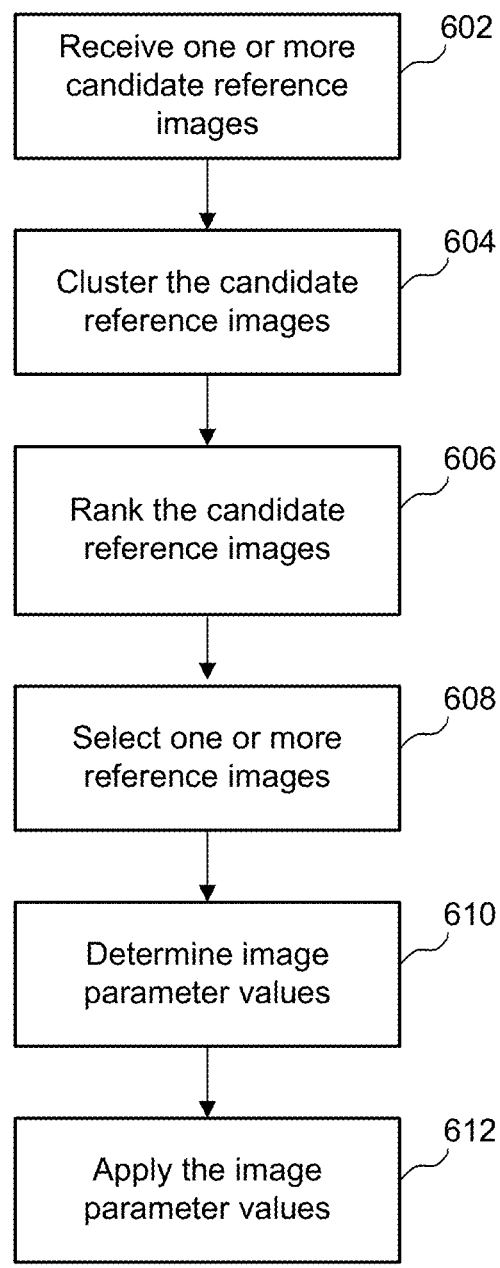
FIG. 6 illustrates an example simplified flow diagram for providing image parameters in a social network system, according to some implementations.

FIG. 6 illustrates an example simplified flow diagram for providing image parameters in a social network system, according to some implementations. In block 602, system 102 receives one or more candidate reference images which are both associated with a target user, and are accessible within the social network.

In block 604, system 102 clusters the candidate reference images into clusters/categories. In various implementations, system 102 clusters the candidate reference images into clusters or categories based on content and style (e.g., portrait, landscape, images of cars, houses, trees, etc.). System 102 may also cluster the candidate images into clusters or categories based on other factors (e.g., images taken at night, at sunrise, sunset, etc).

In block 606, system 102 ranks the candidate reference images. In various implementations, system 102 may rank the candidate reference images based on the social activity of the target user and based on the clusters (or clustering). In some implementations, system 102 may rank all candidate reference images in a given cluster based on a predetermined weighting function. For example, system 102 may rank images that have been recommended higher than images that were merely looked at, etc.

In various implementations, system 102 may assign various weights to different attributes. For example, system 102 may give images that are looked at one weight (e.g., a "1"), may give images that are recommended another weight (e.g., a "5"), may give images that the target user comments on another weight (e.g., a "10"), etc.

Other ranking and weighting schemes including other attributes are possible, depending on the particular implementation. For example, in some implementations, system 102 may rank photographers, where the target user likes the style of a particular photographer. As such, system 102 may determine various social signals with regard to images from particular photographers. System 102 may also cluster images based on photographers, as a part of the clustering implementations described herein.

In some implementations, system 102 may ensure that the taste of a user is estimated based on images that are liked because of their photographic quality as opposed to images that are liked because of content (e.g., images that are humorous).

In block 608, system 102 selects one or more reference images from the candidate reference images based on the ranking.

In block 610, system 102 determines the one or more image parameter values from the one or more selected reference images. In various implementations, system 102 may store the determined or identified image parameter values in a database or in any suitable storage location. In some implementations, system 102 may associate the image parameters with a given set of fixed filters to be applied to images. In various implementations, system 102 may then take any one or more of the stored image parameter values and/or associated filters for use in modifications to other images.

In block 612, system 102 applies the one or more image parameter values from the one or more selected reference images to one or more unenhanced images (e.g., newly uploaded images). In various implementations, system 102 may apply the one or more image parameters in connection with filters to the one or more unenhanced images.

In some implementations, system 102 may apply image parameters to a given target image based on a combination of factors associated with content, type recognition, etc. For example, in some implementations, for portrait images, system 102 may apply only editing steps that have been applied on portrait images. In addition to basing suggested image enhancements on images liked by this user, in some implementations, system 102 may suggest image enhancements that are liked by many users (not necessarily the current user).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Implementations described herein provide various benefits. For example, implementations combine data associated with how images were edited with data associated with images a particular user likes in order to provide suggestions for image edits. Implementations require little or no knowledge about editing image parameters, and also enable newly edited images to be easily modified.

Figure 7:
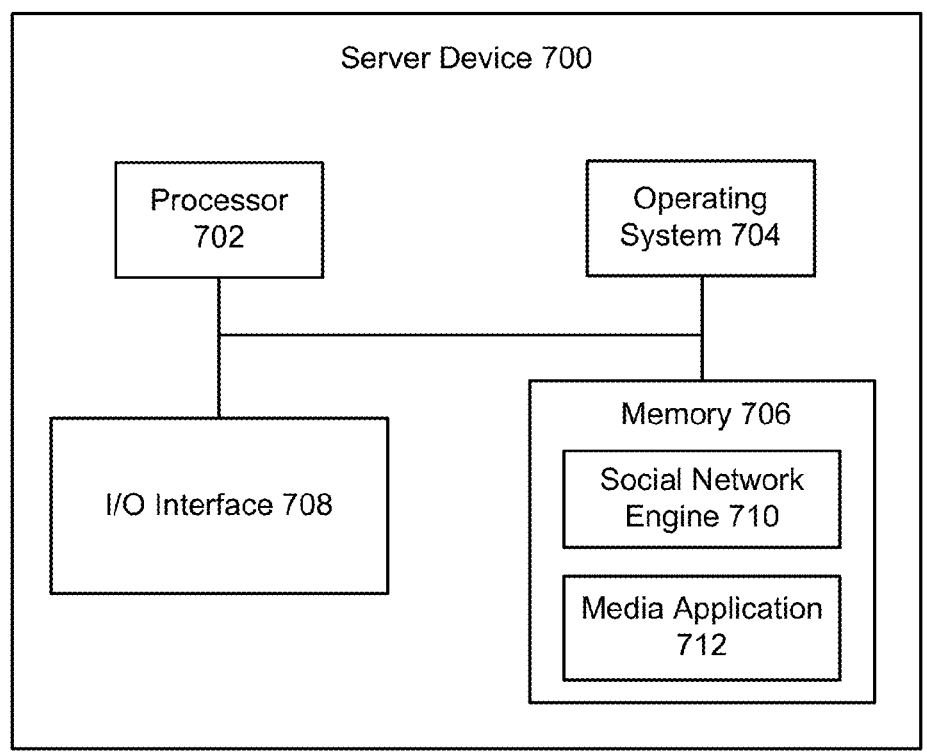
FIG. 7 illustrates a block diagram of an example server device, which may be used to implement the implementations described herein.

FIG. 7 illustrates a block diagram of an example server device 700, which may be used to implement the implementations described herein. For example, server device 700 may be used to implement server device 104 of FIG. 1, as well as to perform the method implementations described herein. In some implementations, server device 700 includes a processor 702, an operating system 704, a memory 706, and an input/output (I/O) interface 708. Server device 700 also includes a social network engine 710 and a media application 712, which may be stored in memory 706 or on any other suitable storage location or computer-readable medium. Media application 712 provides instructions that enable processor 702 to perform the functions described herein and other functions.

For ease of illustration, FIG. 7 shows one block for each of processor 702, operating system 704, memory 706, I/O interface 708, social network engine 710, and media application 712. These blocks 702, 704, 706, 708, 710, and 712 may represent multiple processors, operating systems, memories, I/O interfaces, social network engines, and media applications. In other implementations, server device 700 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
   receiving a plurality of reference images associated with a target user in a social network system;
   clustering the reference images based on one or more of content and style of the reference images, wherein the reference images are received based on the target user's interactions with the reference images;
   ranking the reference images based on the clustering and a social activity of the target user;
   selecting one or more of the reference images based on the ranking;
   determining one or more image parameter values based on the social activity of the target user, wherein the social activity includes the target user interacting with one or more of the selected reference images; and
   modifying one or more target images based on the one or more determined image parameter values.

2. The method of claim 1,
   further comprising determining one or more filters based on the determined image parameter values, wherein the modifying of the one or more target images includes applying the one or more determined filters to the one or more target images.

3. The method of claim 1, wherein the social activity comprises at least one reference image being interacted with in the social network system.

4. The method of claim 1, wherein the social activity comprises at least one reference image a predetermined number of times in the social network system.

5. The method of claim 1, wherein the social activity comprises at least one reference image in the social network system.

6. The method of claim 1, wherein the social activity comprises at least one reference image in the social network system.

7. A method comprising:
   receiving a plurality of reference images associated with a target user in a social network system;
   clustering the reference images based on one or more of content and style of the reference images;
   ranking the reference images based on the clustering and a social activity of the target user;
   selecting one or more of the reference images based on the ranking;

determining one or more image parameter values based on the social activity of the target user, wherein the social activity includes the target user interacting with one or more of the selected reference images; and modifying one or more target images based on the one or more determined image parameter values.

8. The method of claim 7, wherein the social activity comprises at least one reference image being viewed a predetermined number of times in the social network system.

9. The method of claim 7, wherein the social activity comprises at least one reference image being recommended in the social network system.

10. The method of claim 7, wherein the social activity comprises at least one reference image being commented on in the social network system.

11. A system comprising:

one or more processors; and logic encoded in one or more non-transitory tangible media for execution by the one or more processors and when executed are operable to perform operations comprising: receiving a plurality of reference images associated with a target user in a social network system;

clustering the reference images based on one or more of content and style of the reference images;

ranking the reference images based on the clustering and a social activity of the target user;

selecting one or more of the reference images based on the ranking;

determining one or more image parameter values based on the social activity of the target user, wherein the social activity includes the target use interacting with one or more of the selected reference images; and modifying one or more target images based on the one or more determined image parameter values.

12. The system of claim 11, wherein the reference images are received based on the target user's interactions with the reference images.

13. The system of claim 11, further comprising determining one or more filters based on the determined image parameter values, wherein the modifying of the one or more target images includes applying the one or more determined filters to the one or more target images.

14. The system of claim 11, wherein the social activity comprises at least one reference image being interacted with in the social network system.

15. The system of claim 11, wherein the social activity comprises at least one reference image being viewed a predetermined number of times in the social network system.

16. The system of claim 11, wherein the social activity comprises at least one reference image being recommended in the social network system.

\* \* \* \* \*